Oct. 7, 1947.  I. R. PLANT ET AL  2,428,469
WHEEL PROTECTOR
Filed Feb. 1, 1945  3 Sheets-Sheet 1
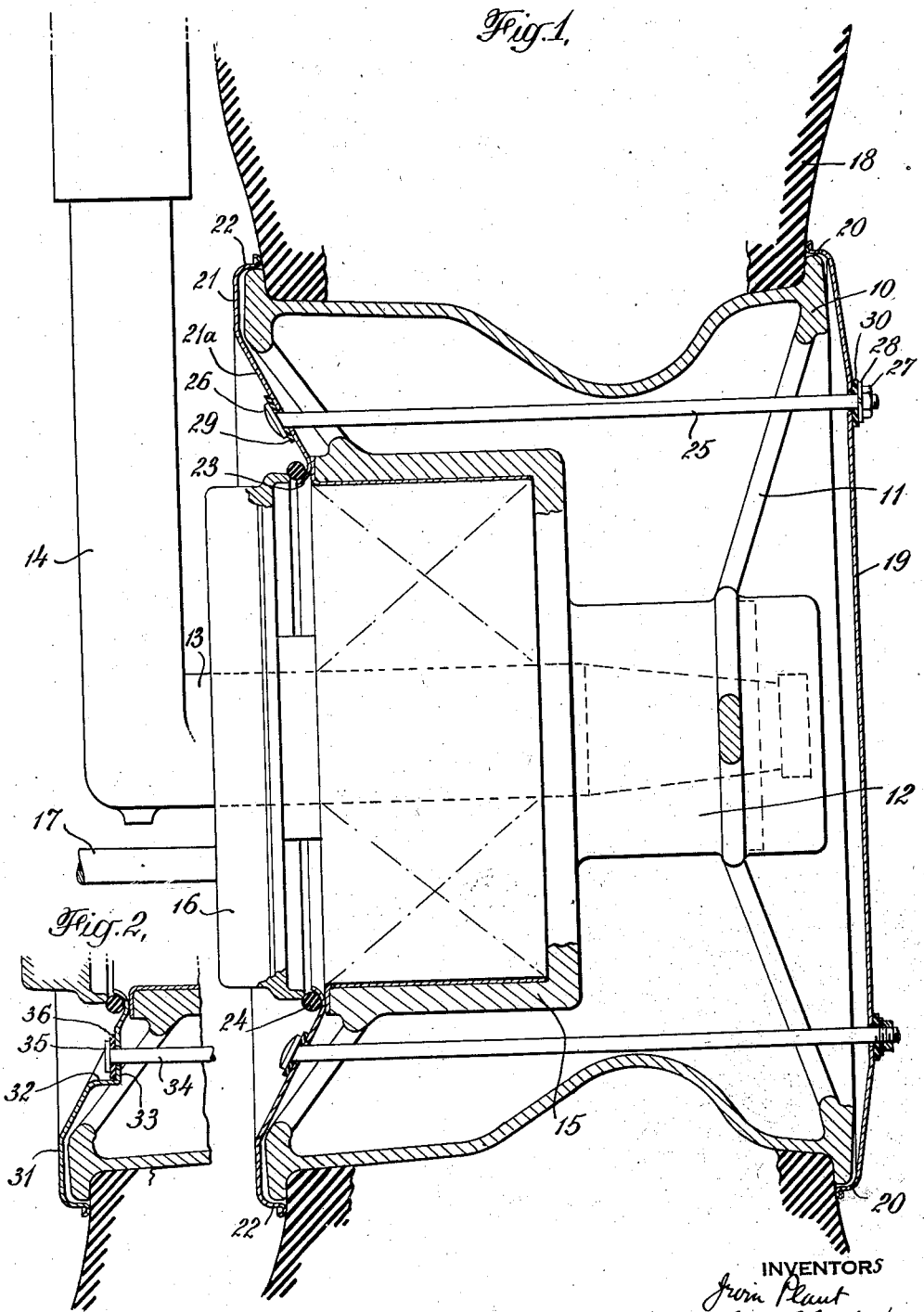
INVENTORS
BY
ATTORNEYS

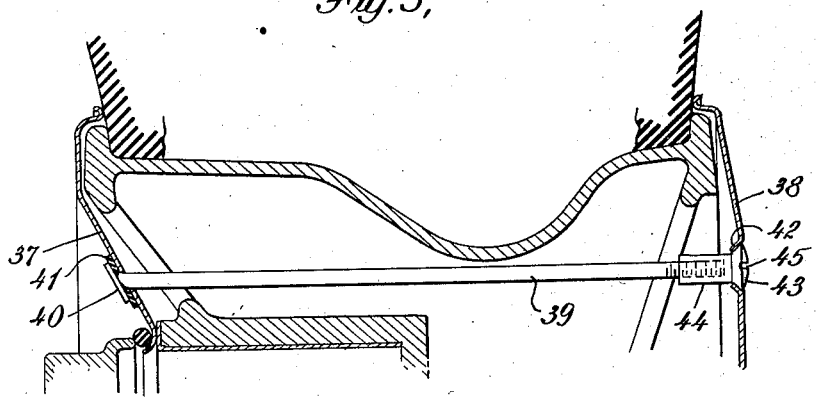
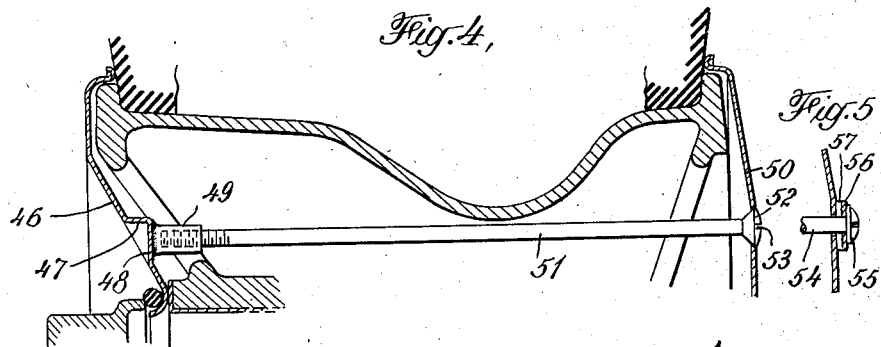
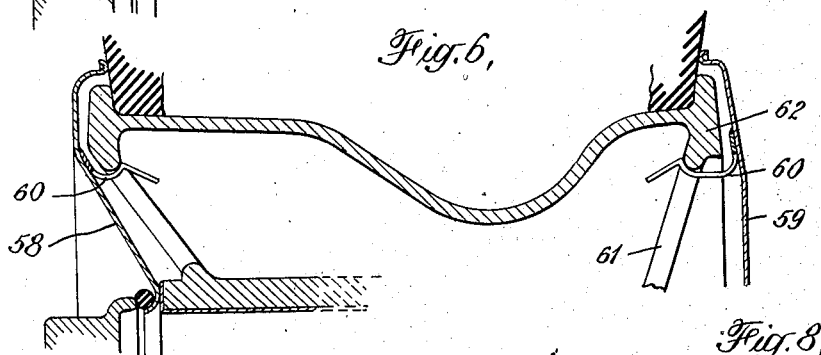
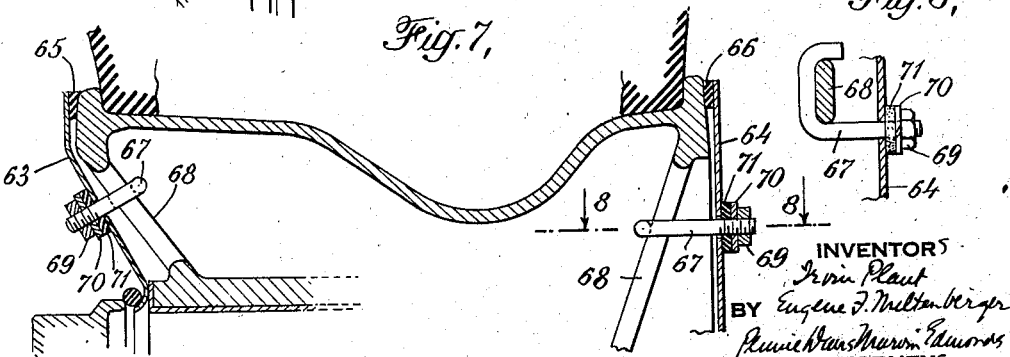

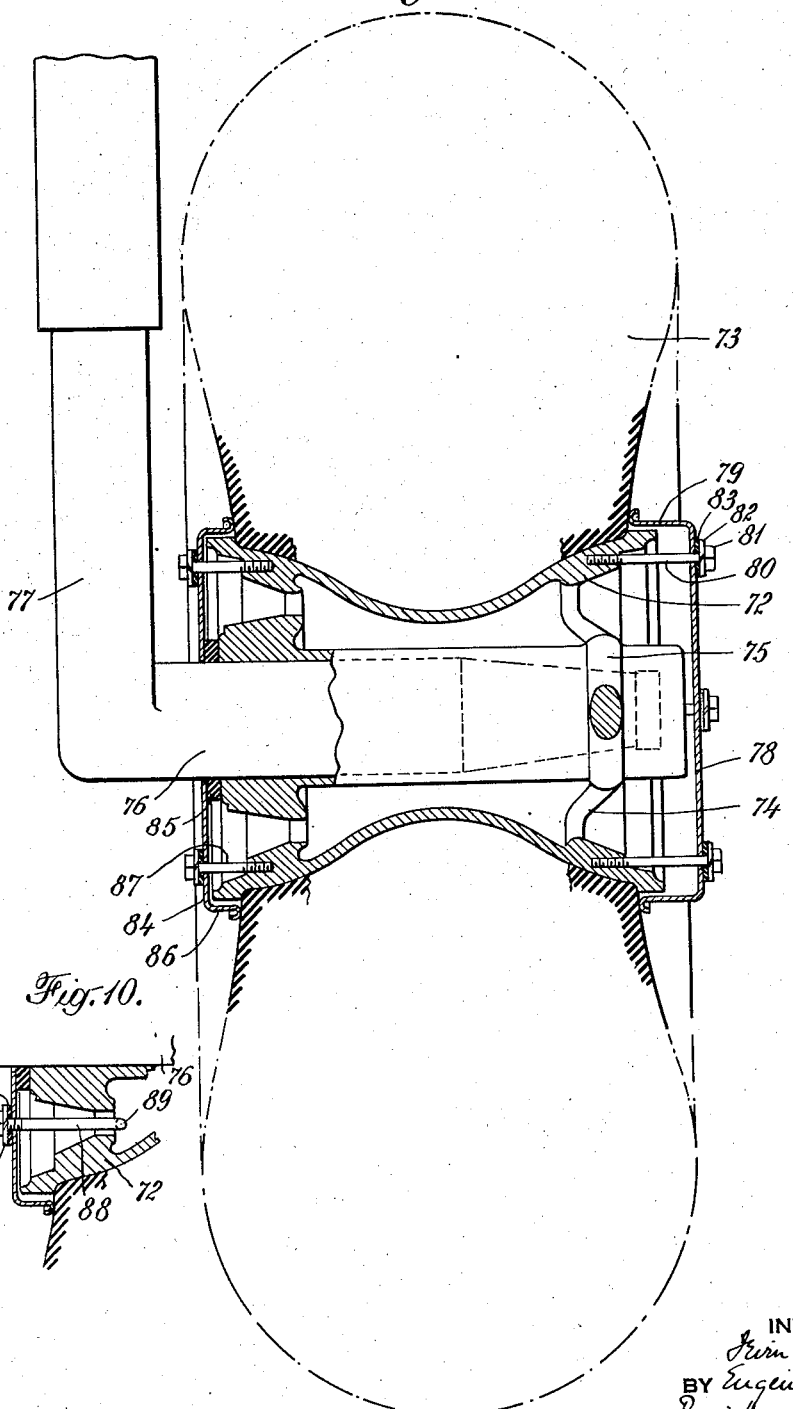

Patented Oct. 7, 1947

2,428,469

UNITED STATES PATENT OFFICE 2,428,469

WHEEL PROTECTOR

Irvin R. Plant, North Bergen, and Eugene F. Miltenberger, Red Bank, N. J., assignors of one-fourth to William A. Van Siclen, Bayside, N. Y., and one-fourth to Edward A. Schlichting, West Caldwell, N. J.

Application February 1, 1945, Serial No. 575,665

9 Claims. (Cl. 301—37)

1

This invention relates to devices for protecting wheels against injury, and is concerned more particularly with a novel device especially adapted for use on the wheels of airplanes, which are to be transported as a deck load on ships, to shield the wheels against the corrosive action of sea water. The new device is of simple, inexpensive construction, light in weight, and easily applied and removed, and it so encloses the metal parts of the wheel as to afford complete protection therefor.

At the present time, it is the common practice to ship certain types of airplanes across the ocean as a deck load on ships. For this purpose, the wings of each plane are removed, a protective covering is placed about the motor, and the plane is then anchored in place on the deck by suitable means. The wheels of such planes are ordinarily made of magnesium alloys, which are readily attacked by sea water, and, while flying spray has no harmful effect on the remainder of the plane, the wheels have been found to be seriously corroded during deck shipment. It has been proposed heretofore to prevent such injury by removing the wheels and replacing them by wooden discs, but such discs, if of the necessary strength to carry the weight of the plane and permit it to be moved about on the dock and on ship board, are quite unsatisfactory, because they are heavy and awkward to handle.

The present invention is, accordingly, directed to the provision of a device for protecting the wheels of airplanes against injury during shipment, which may be applied to a wheel in a simple operation and, after application, permits the plane to be freely moved to its final position. The device may be made in different forms suitable for wheels of different types and mountings and, in all forms, affords the advantages above pointed out.

For a better understanding of the invention, reference may be made to the accompanying drawing, in which Fig. 1 is a view, partly in vertical section and partly in elevation, of a wheel with the new protective device in position;

Fig. 2 is a partial sectional view showing a modified form of the device of Fig. 1;

Figs. 3 to 6, inclusive, are fragmentary sectional views of modified forms of the device;

Fig. 7 is a fragmentary sectional view of another form of the device;

Fig. 8 is a sectional view of the line 8—8 of Fig. 7;

Fig. 9 is a view similar to Fig. 1 showing a different type of wheel with the device in place thereon; and Fig. 10 is a fragmentary sectional view showing a modified mounting for the device.

In Fig. 1, one form of the new protective device is illustrated in operative position on a wheel, which comprises a rim 10, spokes 11, and a hub 12, which is mounted on an axle 13 secured to the lower end of a strut 14. The hub is formed with a brake drum 15 containing brake mechanism, which is actuated by means contained in a smaller drum 16 fast on the axle and controlled by a rod 17. The wheel carries the pneumatic tire indicated at 18.

The protective device used with the wheel illustrated includes a disc 19 formed with a peripheral flange 20, the inner diameter of which is slightly greater than the outer diameter of rim 10. Disc 19 is applied to the outer face of the wheel with its flange bearing against the side of the tire and, when the disc is in place, the entire outer face of the wheel is enclosed. The device also includes an inner disc 21, which is formed with an outer peripheral flange 22 similar to flange 20 and bearing on the side wall of the tire, when the disc is in position. The disc 21 has a central opening defined by a flange 23 extending in the opposite direction from flange 22. The diameter of the opening through disc 21 is such that, when the disc is in position, flange 23 lies in the space between the opposed edges of drums 15 and 16. A rubber gasket ring 24 is seated on the outer face of flange 23 and bears against the adjacent edge of drum 16 to seal the opening between flange 23 and the edge of drum 16.

The discs are held in position in any desired way, and, in the construction illustrated, bolts 25 are passed through openings in the discs. Each bolt has a head 26 lying at an angle to the stem of the bolt, so that the under surface of the head may lie parallel to the inwardly extending portion 21a of inner disc 21. At its outer end, the bolt is provided with a nut 27 and a washer 28. Rubber gaskets 29, 30 are seated beneath head 26 and washer 28, respectively, to prevent moisture from entering the interior of the wheel around the bolt openings.

Discs 19 and 21 may be made of any suitable material, such as metals or plastics, but, for most purposes, metal is preferred. The metal used may be any ordinary type, such as sheet steel, and the outer faces of the discs may be painted or otherwise treated to resist corrosion. The discs illustrated in Fig. 1, if made of metal, can be produced by a standard spinning operation and the manufacture of such discs requires little investment for tools.

In the use of the protective device shown in Fig. 1, the wheel is removed from the axle and the inner disc 21 and gasket 24 are slipped over the axle, the gasket preferably being passed beyond drum 16 and wrapped around the strut. The wheel is then put back on the axle and secured in place and the two discs are moved up against the faces of the wheel and secured together by the bolts. With the parts in this condition, the plane can be moved about as desired. When it is in its final resting place, the gasket 24 is slipped back over drum 16 and into the position shown in Fig. 1, where it bears against flange 23 and the adjacent end of drum 16. With the device in this condition, all of the metal parts of the wheel are enclosed and there is no opportunity for sea water to come in contact with the wheel. It will be noted that each of the discs is provided with a flange bearing against the side of the tire and the formation of the discs is such that, when they are drawn together by the bolts, the flanges press tightly against the tire and the latter serves to seal the discs around their outer edges.

In that form of the device shown in Fig. 1, the inner disc was formed by a spinning operation and, because of its conical portion 21a, the bolts used are of special construction, in that their heads lie at an angle to the bolt stems. The use of such special bolts may be avoided by the construction illustrated in Fig. 2, in which the inner disc 31 is formed with recesses 32 having flat faces 33 lying parallel to the flat, central portion of the outer disc 19. When such an inner disc is used, bolts 34 may be of the standard type and have heads 35, which lie at right angles to the stems of the bolts. As before, a rubber gasket 36 is placed under the head of each bolt before the bolt is tightened up. The inner disc 31 shown in Fig. 2 may be made of any of the materials previously referred to, but, because of the provision of the recesses 32, it can not be made by spinning but must be formed by a stamping or pressing operation.

In the construction shown in Fig. 3, the inner and outer discs 27, 38, respectively, are connected together by bolts 39 and each bolt has an angularly disposed head 40, which bears against a gasket 41 in contact with the inner disc. The outer disc is formed with openings defined by inwardly coned flanges 42 and in each opening is seated the head 43 of a nut 44, into which the end of the bolt is threaded. The head 43 is provided with a screw driver slot 45. With this construction, no gasket need be employed under the end of nut 44, although it is desirable to apply grease to the outer faces of the flanges 42 before the nuts are placed in position.

In the construction shown in Fig. 4, the inner disc 46 is formed with recesses 47 having flat bottoms 48 and an internally threaded block 49 is secured to the inner surface of the bottom 48 of each recess. The inner disc 46 and outer disc 50 are then held in place on the wheel by bolts 51, which are passed through openings in the outer disc and threaded into blocks 49. Each opening in the disc 50 is reamed and each bolt has a head 52 which fits snugly in the opening and is provided with a screw driver slot 53. If desired, the bolts 51 may be replaced by bolts 54 having heads 55 with flat under surfaces, as shown in Fig. 5. When bolts 54 are used, a washer 56 is placed beneath the head of each bolt and a gasket 57 lies between the washer and the outer face of disc 50.

In the construction shown in Fig. 6, the bolts are dispensed with and both the inner and outer discs 58, 59, respectively, are provided with spring clips 60, which are secured to the inner faces of the disc in any suitable manner, such as welding, and are so shaped that they will slip through the openings between the spokes 61 of the wheel and engage behind the inner edges of the rim 62.

In each of the constructions above described, both the inner and outer discs are provided with outer peripheral flanges which bear against the tire. In the construction shown in Fig. 7, the discs 63, 64 do not have such flanges and gaskets 65, 66 are interposed between the outer surface of the rim and the inner surfaces of the respective discs. The discs may be held in place by bolts similar to any of those above described, or by hooks 67 which are engaged with the spokes 68 of the wheel. Each hook is threaded and held in place by a nut 69 bearing against the washer 70, which in turn bears against a gasket 71 in contact with the outer face of a disc. With the Fig. 7 construction, small portions of the rim of the wheel are exposed and these may be protected by a coating of suitable material. It is to be understood that hooks 67 may be used with any of the other constructions, if desired.

The construction shown in Fig. 9 is intended to be used with a wheel, such as the tail wheel of an airplane, which rotates freely on an axle and is not provided with a brake. The wheel includes a rim 72, on which is seated a pneumatic tire 73, and the rim is connected by spokes 74 to a hub 75 mounted on axle 76 carried by a strut 77. The protective device includes an outer disc 78 formed with a peripheral flange 79 of greater inner diameter than the outer diameter of the rim, so that when the disc is in place the flange will bear against the side wall of the tire. The disc may be held in position by any of the means used with other constructions or by screws 80 threaded into tapped openings in the wheel rim. Each screw is provided with a head 81 beneath which is placed washer 82 and a gasket 83 in direct contact with the disc.

The inner disc 84 of the device is formed with a central opening through which the axle extends, and a gasket 85 of suitable compressible material, such as a rubber compound, is interposed between the inner edge of disc 84 and the adjacent face of the wheel hub. Preferably, the gasket fits the axle tightly so as to prevent the entrance of moisture along the axle into the space within the wheel. Disc 84 is provided with an outer peripheral flange 86 which bears against the wall of the tire and the disc is held in place by screws 87 similar to screws 80 and threaded into tapped openings in the wheel rim.

The inner and outer discs 78, 84 of the Fig. 9 construction can be held in place by hooks instead of screws, as shown in Fig. 10. Each hook 88 has an inner end 89 which can be engaged behind the inner face of one of the spokes of the wheel. The hook passes through an opening in the disc and at its outer end, carries a nut 90 bearing against a washer 91 which in turn bears against a gasket 92 in contact with the outer face of the disc.

In each of the preferred constructions, the discs are formed with outer flanges bearing against the side walls of the tire and the discs are of such form that, when they are secured in position, the flange is pressed tightly against the tire so that a good seal is formed. In each instance, the outer disc is of solid construction, while the inner disc has an opening through which the axle extends. The manner in which the inner disc is sealed on the axle depends on the wheel construction, but gasket means are provided so as to prevent the entrance of moisture into the interior of the wheel.

We claim:

1. A protective device for a wheel provided with a pneumatic tire and mounted on an axle, which comprises an outer disc mounted on the outer face of the wheel, the disc having a rim bearing on the outer side of the tire, an inner open center disc mounted against the inner face of the wheel with the axle extending through the opening in the disc, the inner disc having an outer rim bearing on the inner side of the tire, a member mounted on the axle and extending close to the edge of the opening through the inner disc, means for securing the discs in position, and means for sealing the space between the inner disc and said member.

2. A protective device for a wheel provided with a pneumatic tire and mounted on an axle, which comprises an outer disc mounted on the outer face of the wheel and having a rim bearing on the outer side of the tire, an open center disc mounted against the inner face of the wheel with the axle extending through the opening in the disc, the inner disc having an outer rim bearing on the inner side of the tire, a member mounted on the axle and extending close to the edge of the opening through the inner disc, means for sealing the space between the inner disc and said member, and means engaging the discs and extending through the wheel for securing the discs in place.

3. A protective device for a wheel provided with a pneumatic tire and mounted on an axle, which comprises an outer disc mounted on the outer face of the wheel and having a rim bearing on the outer side of the tire, an open center disc mounted against the inner face of the wheel with the axle extending through the opening in the disc, the inner disc having an outer rim bearing on the inner side of the tire, a member mounted on the axle and extending close to the edge of the opening through the inner disc, means for sealing the space between the inner disc and said member, bolts engaging the discs and extending through the wheel for securing the discs in place.

4. A protective device for a wheel provided with a pneumatic tire and mounted on an axle, which comprises an outer disc mounted on the outer face of the wheel and having a rim bearing on the outer side of the tire, an open center disc mounted against the inner face of the wheel with the axle extending through the opening in the disc, the inner disc having an outer rim bearing on the inner side of the tire, a member mounted on the axle and extending close to the edge of the opening through the inner disc, means for sealing the space between the inner edge of the inner disc and said member, and means passing through the discs and engaging the wheel for securing the discs in place.

5. A protective device for a wheel provided with a pneumatic tire and mounted on an axle, which comprises an outer disc mounted on the outer face of the wheel and having a rim bearing on the outer side of the tire, an open center disc mounted against the inner face of the wheel with the axle extending through the opening in the disc, the inner disc having an outer rim bearing on the inner side of the tire, a member mounted on the axle and extending close to the edge of the opening through the inner disc, means for sealing the space between the inner disc and said member, and means engaged behind portions of the wheel and with the discs for holding them in place.

6. A protective device for a wheel provided with a pneumatic tire and mounted on an axle carrying a drum, which comprises an outer disc mounted against the outer face of the wheel and having a rim bearing against the side of the tire, an inner open center disc mounted against the inner face of the wheel with the axle extending through the opening, the inner disc having an outer rim bearing against the side of the tire and a flange surrounding the opening and lying close to the drum, means for sealing the space between the flange and the drum, and means for securing the discs in place.

7. A protective device for a wheel provided with a pneumatic tire and mounted on an axle carrying a drum, which comprises an outer disc mounted against the outer face of the wheel and having a rim bearing against the side of the tire, an inner open center disc mounted against the inner face of the wheel with the axle extending through the opening, the inner disc having an outer rim bearing against the side of the tire and a flange surrounding the opening and lying close to the drum, a sealing ring of resilient material closing the space between the flange and the drum, and means for securing the discs in place.

8. A protective device for a wheel provided with a pneumatic tire and mounted on an axle carrying a drum, which comprises an outer disc mounted against the outer face of the wheel and having a rim bearing against the side of the tire, an inner open center disc mounted against the inner face of the wheel with the axle extending through the opening, the inner disc having an outer rim bearing against the side of the tire and a flange surrounding the opening and lying close to the drum, means for sealing the space between the flange and the drum, and bolts extending through the wheel and engaging the discs to hold them in place.

9. A protective device for a wheel provided with a pneumatic tire and mounted on an axle carrying a drum, which comprises an outer disc mounted against the outer face of the wheel and having a rim bearing against the side of the tire, an inner open center disc mounted against the inner face of the wheel with the axle extending through the opening, the inner disc having an outer rim bearing against the side of the tire and a flange surrounding the opening and lying close to the drum, means for sealing the space between the flange and the drum, and members engaging portions of the wheel and the discs for holding the discs in place.

IRVIN R. PLANT.
EUGENE F. MILTENBERGER.

REFERENCES CITED

The following references are of record in the file of this patent:

UNITED STATES PATENTS

| Number | Name | Date |
|---|---|---|
| 1,307,611 | Blair | June 24, 1919 |

(Other references on following page)

UNITED STATES PATENTS

| Number | Name | Date |
|---|---|---|
| 2,106,586 | Zerk | Jan. 25, 1938 |
| 1,234,387 | Pugh | July 24, 1917 |
| 1,494,179 | Matthew | May 13, 1924 |
| 1,587,762 | Cunnington | June 8, 1926 |
| 1,694,033 | Cunnington | Dec. 4, 1928 |
| 2,012,449 | Hamilton | Aug. 27, 1935 |
| 2,016,395 | Sinclair | Oct. 8, 1935 |

FOREIGN PATENTS

| Number | Country | Date |
|---|---|---|
| 191,479 | Great Britain | Jan. 15, 1923 |
| 147,073 | Great Britain | Apr. 14, 1921 |
| 179,431 | Great Britain | May 11, 1922 |